Dec. 27, 1966            M. STERN            3,295,060
PEAK-TO-PEAK A.C. SIGNAL MEASURING SYSTEM USING TWO
COMPLEMENTARY TRANSISTORS HAVING CAPACITOR OUTPUT
MEANS AND A COMMON INPUT TO DERIVE PROPORTIONAL
POSITIVE AND NEGATIVE PEAK VOLTAGES
Filed March 21, 1963
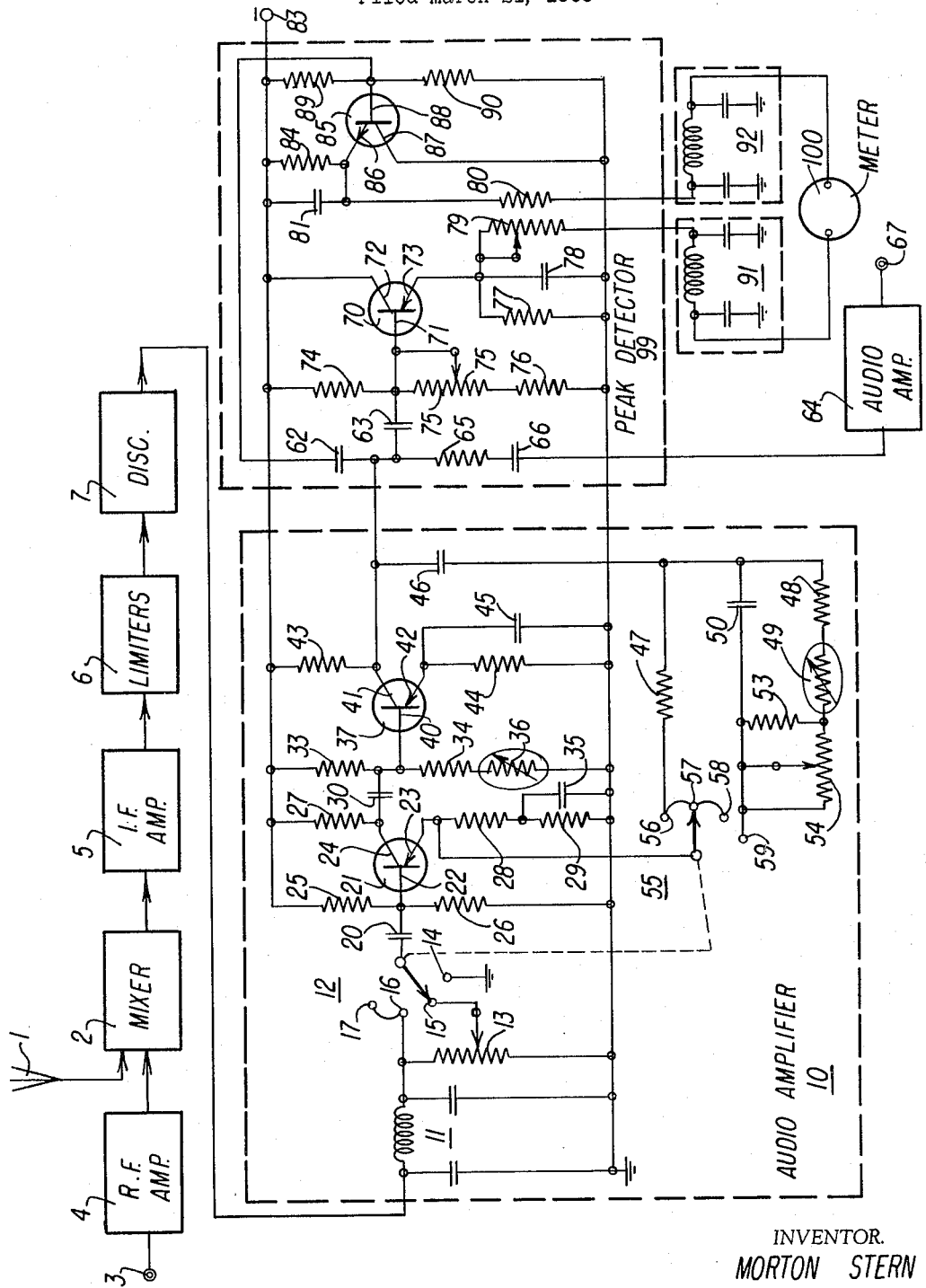
INVENTOR.
MORTON STERN
BY Mueller & Aichele
ATTYS.

United States Patent Office 3,295,060
Patented Dec. 27, 1966

3,295,060
PEAK-TO-PEAK A.C. SIGNAL MEASURING SYSTEM USING TWO COMPLEMENTARY TRANSISTORS HAVING CAPACITOR OUTPUT MEANS AND A COMMON INPUT TO DERIVE PROPORTIONAL POSITIVE AND NEGATIVE PEAK VOLTAGES
Morton Stern, Chicago, Ill., assignor to Motorola, Inc., Franklin Park, Ill., a corporation of Illinois
Filed Mar. 21, 1963, Ser. No. 266,835
8 Claims. (Cl. 324—103)

This invention relates to a deviation meter and in particular to a transistorized deviation meter system for measuring the peak to peak deviation of a frequency modulated wave.

In measuring the deviation of a frequency modulated wave it is desirable to measure both the positive and negative deviation peaks as the deviation may not be symmetrical and, therefore, to measure only the positive or negative peak would cause an error. In order to provide a meter which is compact, lightweight, and portable it is desirable to use transistors for the active elements of the measuring circuit. Because of the low impedance levels of transistors it is not possible to substitute transistors into existing tube circuit for measuring peak to peak deviation, which are of the voltage doubler type. Likewise the unsymmetrical output impedance characteristics of transistor phase splitters make this method of separating the positive and negative peaks subject to errors. Since it is desirable to be able to measure peak deviation at very low modulation frequencies, it is difficult to use transformer coupling as the transformer becomes too large to be included in a small meter package.

Accordingly, it is an object of this invention to provide a deviation meter which measures both the positive and negative deviation of a frequency modulated wave.

Another object of this invention is to provide a deviation meter which combines the positive and negative deviation measurements to establish overall peak to peak deviations.

A further object of this invention is to provide a compact, lightweight meter which will measure the peak to peak deviation of a frequency modulated wave.

A feature of this invention is the provision of a deviation meter which uses transistors having complementary symmetry to measure the positive and negative peak deviation of a frequency modulated wave.

Another feature of this invention is the use of capacitors to store the peak voltage of an alternating current signal so that it can be measured by a meter.

A further feature of this invention is the provision of a deviation meter with an amplifier having a temperature compensated feedback network to provide stable gain for low frequency signals, with said feedback network including temperature compensating means and switching means for controlling the amount of feedback.

The single figure of the drawing shows a partial schematic and partial block diagram of a deviation meter for measuring the peak to peak deviation of a frequency modulated wave.

In practicing this invention a deviation meter is provided wherein an alternating current signal is derived whose positive and negative peak voltages are proportional respectively to the positive and negative peak deviations of the frequency modulated wave that is being measured. This alternating current signal is coupled to the bases of a pair of transistors having complementary symmetry. Transistors having complementary symmetry consist of P-N-P and N-P-N transistors with substantially identical characteristics except for the reversal in polarity. Each transistor has a capacitor in its output circuit which is charged through the transistor when it is biased so that it is conducting. Since the transistors are complementary, one of the capacitors is charged during the positive half-cycle and the other is charged during the negative half-cycle. The charging path impedance for each capacitor is very low compared to the discharge path impedance so that the capacitor will retain substantially all of the voltage impressed there across when the transistor is conducting. The voltage present on each of the capacitors is coupled to a meter through a high impedance circuit. The opposite polarity voltages are added so that the voltage measured by the meter is proportional to the peak to peak voltage of the alternating current signal.

Referring to the drawing, the antenna 1 receives the frequency modulated carrier whose deviation is to be measured and couples this signal to the mixer 2. A local oscillator signal is supplied from a separate source and is coupled to the oscillator input 3, amplified in radio frequency amplifier 4, and coupled to the mixer 2. The local oscillator signal and the signal received on antenna 1 are mixed in mixer 2 to form the intermediate frequency signal which is amplified in intermediate frequency amplifier 5 and limiter 6, each of which may include more than one stage. The resulting signal is coupled from the limiter 6 to discriminator 7 where the modulation frequency is derived in the form of an alternating current signal whose peak to peak voltage amplitude is proportional to the peak to peak deviation of the frequency modulated carrier. This alternating current signal is coupled to an audio amplifier 10 which is comprised of two stages of audio amplification.

The audio signal is connected from the discriminator 7 through a filter network 11 and an attenuator switch 12 in the input circuit of the audio amplifier 10. Position 14 of switch 12 is a zero set position and is used to adjust the peak detector as will be described below. Position 15 is used when a maximum deviation of 16 kc. is to be measured and therefore, the alternating current signal can have its maximum peak to peak amplitude. The incoming signal is attenuated by potentiometer 13 which is adjusted to give 16 kc. deviation reading on the meter when the carrier is deviated 16 kc. When a carrier with a maximum deviation of 8 kc. or 1.6 kc. is being measured the switch 12 is placed in position 16 or 17. In these positions the incoming signal is not attenuated.

Switch 12 is mechanically coupled to switch 55 which connects the emitter 23 of transistor 21 to a feedback path from the output of audio amplifier 10. The output of the audio amplifier transistor 37 is coupled to the emitter 23 of transistor 21 through capacitor 46 and resistor 47 when the switch is in the zero set, 16 kc., or 8 kc. positions. This provides negative feedback to the first stage for stabilization of the audio amplifiers. When it is desired to measure a maximum deviation of 1.6 kc. the amount of feedback is reduced and the feedback is coupled from capacitor 46 and through a network comprised of capacitor 50, resistors 48, 53, and 54 and thermistor 49 to the emitter 23 of transistor 21. The amount of this feedback is adjusted by changing potentiometer 54. The purpose of the network coupling the feedback from capacitor 46 to the emitter 23 is to provide the proper frequency response when the meter is used on the 1.6 kc. deviation position of the switch. The modulating frequency normally received when the deviation is less than 1.6 kc. is 1 kc. or less. Since the feedback has been reduced substantially when switch 55 is in position 59, the 1.6 kc. position, temperature stabilization is required and is provided by thermistor 49. This temperature compensation is not necessary with the greater amounts of feedback used when the meter is used in the 8 kc., 16 kc. or zero set position.

The properly attenuated signal is applied to the base 22 of transistor 21 and is amplified in the common emitter amplifier. Resistors 25 and 26 furnish the bias for the base of transistor 21 and resistors 28 and 29 furnish the proper bias for the emitter. Capacitor 35 partially bypasses the emitter resistors to provide frequency compensation for this stage. The load is coupled from the load resistor 27, connected to the collector 24 of transistor 21, through capacitor 30 to the base 40 of transistor 37. The bias for the base of transistor 37 is furnished by resistors 33, 34 and thermistor 36 which varies the bias to compensate for temperature changes. The incoming signal is amplified in this common emitter amplifier and the output appears across load resistor 43 connected to the collector 41 of transistor 37. The resistor 44 furnishes a bias for the emitter 42 of transistor 37 and is bypassed by capacitor 45 to prevent degeneration of the alternating current signal. The output of transistor 37 is coupled to the feedback circuit by capacitor 46 as previously described, and to the two transistors of the peak detectors 70 and 85 through capacitors 62 and 63. The amplifier output is also applied to the monitoring audio amplifier 64 through resistor 65 and capacitor 66. The audio signal thus developed can be heard through earphones connected to audio monitor jack 67.

During the negative half-cycle of the signal applied to the base 71 of transistor 70, this signal will bias the base to emitter junction of transistor 70 so that it will conduct. The current flowing from the emitter to the collector of transistor 70 when it is in the conducting state charges capacitor 78 to a negative voltage substantially equal to the voltage impressed on the base 71. During the positive half-cycle of the signal applied to the base 71, transistor 70 is cut off and capacitor 78 discharges through resistor 77, and through the circuit including resistors 79 and 80 and the meter 100. Since the impedance of the meter discharge path through resistors 79 and 80 is high with respect to the discharge path through resistor 77, capacitor 78 discharges primarily through resistor 77. Resistor 77 has a high impedance compared to that of the charging path through transistor 70 so capacitor 78 discharges at a low rate compared to its charging rate. Before the charge on capacitor 78 can change appreciably, the input signal goes through a complete cycle and restores the charge on capacitor 78 through transistor 70.

The signal appearing on base 71 of transistor 70 also appears on base 88 of transistor 85. Since transistor 85 is the complement of transistor 70, transistor 85 will be biased to conduction during the positive half-cycle of the applied signal. Capacitor 81 is charged to the positive peak of the alternating current signal in a manner similar to that by which capacitor 78 is charged. Resistor 84 forms the discharge path for capacitor 81, with the meter circuit forming a higher impedance discharge path.

The voltages appearing on capacitors 78 and 81 are coupled to the input terminals of meter 100 through resistors 79 and 80 and filters 91 and 92. Since the voltage across capacitor 78 is negative and the voltage across capacitor 81 is positive, the meter 100 will thus read the peak to peak voltage of the alternating current signal applied to the peak detector 99. Since the deviation is proportional to the peak to peak voltage of the alternating current signal, meter 100 can be calibrated to read the deviation of the frequency modulated signal directly in cycles per second. Resistors 79 and 80 are of high impedance to prevent rapid discharge of capacitors 81 and 78 through the meter. The filters 91 and 92 are provided to eliminate any radio frequency energy which may appear on the conductors connecting the meter to the capacitors. Resistors 74, 75, and 76 provide a bias network for the proper bias for the base of transistor 70, and resistors 89 and 90 provide the bias for the base of transistor 85. Resistor 75 is variable and is adjusted so that the voltage appearing at the emitters 73 and 86 of transistors 70 and 85 respectively will be equal when there is no input signal to the peak detector 99. The various operating voltages are derived from a negative potential connected to terminal 83.

The invention provides therefore, an improved deviation meter, capable of measuring both the positive and negative deviation peaks of a frequency modulated signal and which is compact, lightweight, and requires little power to operate.

I claim:

1. A peak detector circuit for use in a system for measuring the deviation of a frequency modulated wave and which includes a portion for recovering the modulation signal from the frequency modulated wave, said peak detector circuit including in combination; first and second transistors each having input and output means, said first and second transistors having complementary symmetry, means for applying the modulation signal to said input means of said first and second transistors in common whereby the same signal is applied to each of said input means, first potential storage means connected between said output means of said first transistor and a first reference potential, second potential storage means connected between said output means of said second transistor and a second reference potential, said first and second potential storage means storing the peak potential applied thereto from said first and second transistor output means, and meter means connected to said first and second potential storage means to measure and indicate the value of the peak potentials applied to said first and second potential storage means.

2. A peak detector circuit for use in a system for measuring the deviation of a frequency modulated wave and which includes a first portion for translating the frequency modulated wave, a second portion for recovering the modulation signal from the frequency modulated wave, and means for amplifying the modulation signal, said peak detector circuit including in combination; first and second transistors each having base, emitter, and collector electrodes, said first and second transistors having complementary symmetry, means connecting said base electrodes of said first and second transistors in common to the amplifying means whereby the same signal is applied to each of said base electrodes, first potential storage means connected in circuit with said emitter and collector electrodes of said first transistor and to a first reference potential, and second potential storage means connected in circuit with said emitter and collector electrodes of said second transistor and to a second reference potential, said first and second potential storage means storing peak potentials of opposite polarities applied thereto from said first and second transistor output means, and meter means connected to said first and second potential storage means to measure and indicate the total value of the peak potentials applied to said first and second potential storage means.

3. In a system for measuring the deviation of a frequency modulated wave and which includes a first portion for translating the frequency modulated wave and a second portion for recovering the modulation signal from the frequency modulated wave, the combination including, means connected to the second portion for amplifying the modulation signal, said amplifying means including temperature compensated feedback means for stabilizing the gain thereof, a peak detector including first and second transistors each having input and output means, said first and second transistors having complementary symmetry, common means for connecting said input means of said first and second transistors to said amplifying means whereby the same signal is supplied to each of said input means, first potential storage means connected between said output means of said first transistor and a first reference potential, second potential storage means connected between said output means of said second transistor and a second reference potential, said first and second potential storage means storing the peak potential applied thereto from said first and second transistor output means, meter means connected to said first and second potential storage means to measure and display the additive value of the peak potentials applied to said first and second potential storage means.

4. In a device for measuring the deviation of a frequency modulated signal and which includes a first portion for translating said frequency molulated signal, a second portion for recovering the modution signal of said frequency modulated signal connected to the first portion, means for amplifying said modulation signal connected to said second portion, said amplifying means including temperature compensated feedback means for stabilizing the gain thereof, a peak detector including in combination, first and second transistors having input and output means, said first and second transistors having complementary symmetry, said input means of said first and second transistors having a common connection to said amplifying means whereby the same signal is applied to each of said input means, a first capacitor and a first resistor connected in parallel between said output means of said first transistor and a first reference potential, a second capacitor and a second resistor connected in parallel between said output means of said second transistor and a second reference potential, said first transistor acting to charge said first capacitor in response to a negative potential applied to said input means of said first transistor, said second transistor acting to charge said second capacitor in response to a positive potential applied to said input means of said second transistor, said first and second resistors acting to discharge said first and second capacitors, the discharge time constant being long in relation to the charging time constant, a meter for measuring the potential stored in said first and second capacitors, circuit means connecting said meter to said output means of said first and second transistors to measure and display the value of the peak potential stored in said first and second capacitors.

5. In a device for measuring the deviation of a frequency modulated signal and which includes a first portion for translating said frequency modulated signal, a second portion for recovering the modulation signal of said frequency modulated signal connected to the first portion, means for amplifying said modulation signal connected to said second portion, a peak detector including in combination; first and second transistors having input and output means, said first and second transistors having complementary symmetry, said input means of said first and second transistors having a common connection to said amplifying means whereby the same signal is applied to each of said input means, a first capacitor and a first resistor connected in parallel between said output means of said first transistor and a first reference potential, a second capacitor and a second resistor connected in parallel between said output means of said second transistor and a second reference potential, said first transistor acting to charge said first capacitor in response to a negative potential applied to said input means of said first transistor, said second transistor acting to charge said second capacitor in response to a positive potential applied to said input means of said second transistor, said first and second resistors acting to discharge said first and second capacitors, the discharge time constant being long in relation to the charging time constant, a meter for measuring the potential stored in said first and second capacitors, circuit means connecting said meter to said ouput means of said first and second transistors to measure and display the value of the peak potential stored in said first and second capacitors.

6. In a system for measuring the deviation of a frequency modulated wave and which includes a portion for recovering the modulation signal of said frequency modulated wave, the combination including means for amplifying the modulation signal including first and second transistors having base, emitter and collector electrodes, input circuit means connected to said base electrode of said first transistor, second circuit means connecting said collector electrode of said first transistor to said base electrode of said second transistor, feedback circuit means to stabilize the gain of said amplifying means connecting said collector electrode of said second transistor to said emitter electrode of said first transistor, said feedback circuit means including switch means for selectively connecting various amounts of feedback and a thermistor to temperature compensate said feedback circuit means when said switch means is positioned to couple the least amount of feedback to said emitter electrode of said first transistor, a peak detector circuit including in combination, third and fourth transistors having input and output means, said third and fourth transistors having complementary symmetry, said input means of said third and fourth transistors having a common connection to said collector electrode of said second transistor, a first capacitor and a first resistor connected in parallel between said output means of said third transistor and a first reference potential, a second capacitor and a second resistor connected in parallel between said output means of said fourth transistor and a second reference potential, said third transistor acting to charge said first capacitor in response to a negative potentional applied to said input means of said third transistor, said fourth transistor acting to charge said second capacitor in response to a positive potential applied to said input means of said fourth transistor, said first and second resistors acting to discharge said first and second capacitors and providing a discharge time constant long in relation to the charging time, and meter means connected to said output means of said third and fourth transistors to measure and display the value of the peak potential stored across said first and second capacitors.

7. A peak detector circuit including in combination, first and second transistors having input and output means, said first and second transistors having complementary symmetry, means for applying a signal to said input means of said first and second transistors in common whereby the same signal is applied to each of said input means, a first capacitor and a first resistor connected in parallel between said output means of said first transistor and a first reference potential, a second capacitor and a second resistor connected in parallel between said output means of said second transistor and a second reference potential, said first transistor acting to charge said first capacitor in response to a negative potential applied to said input means of said first transistor, said second transistor acting to charge said second capacitor in response to a positive potential applied to said input means of said second transistor, said first and second resistors acting to discharge said first and second capacitors with the discharge time constant being long in relation to the charging time, and meter means connected to said output means of said first and second transistors to measure and display the value of the peak potential stored across said first and second capacitors.

8. In a system for measuring the deviation of a frequency modulated wave and which includes a portion for recovering the modulation signal from said frequency modulated wave, the combination including, means for amplifying the modulation signal including first and second transistors having base, emitter and collector electrodes, input circuit means connected to said base electrode of said first transistor, circuit means connecting said collector electrode of said first transistor to said base electrode of said second transistor, feedback circuit means to stabilize the gain of said amplifying means connecting said collector electrode of said second transistor to said emitter electrode of said first transistor, said feedback circuit means including switch means for selecting different amounts of feedback and a thermistor to temperature compensate said feedback circuit means when said switch means is positioned to couple the least amount of feedback to said emitter electrode of said first transistor, a peak detector circuit including third and fourth transistors having input and output means, said third and fourth transistors having complementary symmetry, common means connecting said collector electrode of said second transistor to said input means of said third and fourth transistors, a first potential storage means connected to said output means of said third transistor, and a second potential storage means connected to said output means of said fourth transistor, said first and second potential storage means storing the peak potential applied thereto from said third and fourth transistor output means, meter means connected to said first and second potential storage means to measure and indicate the value of the peak potential applied to said first and second potential storage means.

References Cited by the Examiner

UNITED STATES PATENTS

| | | | |
|---|---|---|---|
| 2,878,384 | 3/1959 | Holmes | 329—103 |
| 3,223,937 | 12/1965 | McDonald | 330—28 |

RUDOLPH V. ROLINEC, *Primary Examiner.*

J. J. MULROONEY, *Assistant Examiner.*